Sept. 8, 1964 C. W. MUSSER 3,147,640
WAVE GENERATOR FOR WAVE CONVERTER
Filed April 13, 1960 3 Sheets-Sheet 1

Inventor
C. Walton Musser
By his Attorney

Sept. 8, 1964  C W. MUSSER  3,147,640
WAVE GENERATOR FOR WAVE CONVERTER
Filed April 13, 1960  3 Sheets-Sheet 2

Sept. 8, 1964   C W. MUSSER   3,147,640
WAVE GENERATOR FOR WAVE CONVERTER
Filed April 13, 1960   3 Sheets-Sheet 3

United States Patent Office 3,147,640
Patented Sept. 8, 1964

3,147,640
WAVE GENERATOR FOR WAVE CONVERTER
C Walton Musser, Beverly, Mass., assignor to United Shoe Machinery Corporation, Boston, Mass., a corporation of New Jersey
Filed Apr. 13, 1960, Ser. No. 21,915
14 Claims. (Cl. 74—640)

The present invention relates to wave converters such as harmonic drives and dynamic splines and particularly to improve wave generators therefor.

A purpose of the invention is to reduce the mass and therefore the inertia of a wave generator for a wave converter.

A further purpose is to permit the use of a wave generator rotor which is of such light structure that it is lacking in radial stiffness, and to back up and obtain radial rigidity for the wave generator rotor by anti-friction bearing round elements such as balls or rollers which at one side follow a relatively rigid suitably circular race, and which at the other side act against the wave carrier to deflect it into an elliptoidal contour either directly or through an intervening race.

A further purpose is to simplify and improve the construction of wave converters of very large size, particularly those which are operatively interconnected with heavy structures.

A further purpose is to utilize a double ball or roller bearing to engage and transmit to or from the circular side and also to or from the elliptoidal side of a wave generator rotor.

A further purpose is to pivot sets of rollers on a wave generator rotor, one of which sets defines a circular path and the other of which sets defines an elliptoidal path, those defining the circular path engaging a circular race and those defining the elliptoidal path flexing the flexible wave carrier or a race adjoining it.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is for convenience in illustration greatly exaggerated as to the thicknesses of the balls and races compared to the overall diameter, so that the construction of the wave generator can be more clearly understood.

FIGURE 4 is a transverse section on the line 4—4 of FIGURE 5, the section omitting the extra sets of teeth. The thickness of the wave generator parts has been exaggerated compared to the overall diameter for convenience in illustration.

Figure 4:
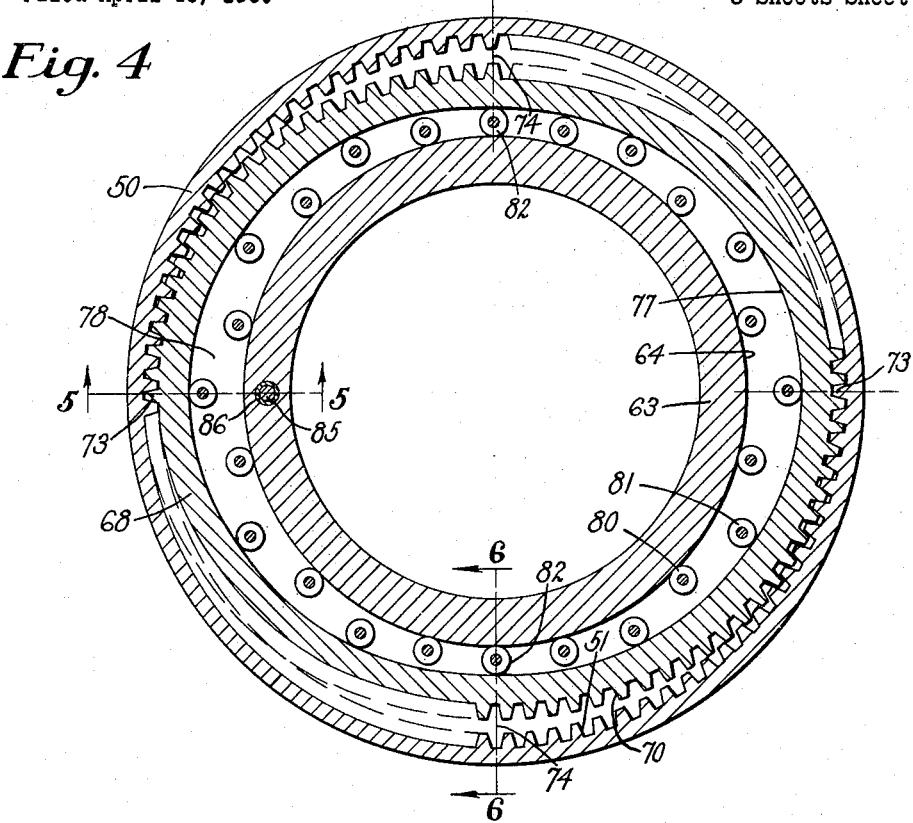
FIGURES 4, 5, 6 and 7 show a variation in the device of the invention.
Figure 5:
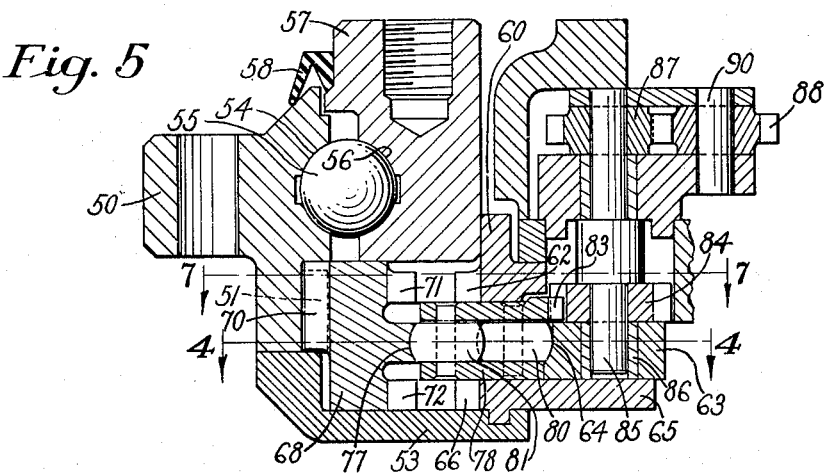
Figures 6, 7:
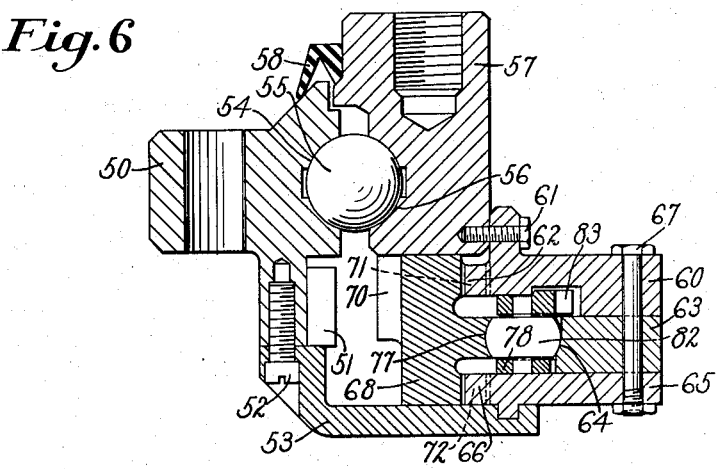

FIGURE 5 is a section on the line 5—5 of FIGURE 4.
FIGURE 6 is a section on the line 6—6 of FIGURE 4.
FIGURE 7 is a section on the line 7—7 of FIGURE 5.

Describing in illustration but not in limitation and referring to the drawings:

There are many advantages as set forth in my U.S. Patent 2,906,143, granted September 29, 1959, for Strain Wave Gearing and in my U.S. patent application Serial No. 779,320, filed December 10, 1958, for Spline and Rotary Table, now Patent No. 2,959,065, in using wave converters especially for large and heavy structures which must be precisely located as to angle.

Where reference is made herein to a wave converter, it is intended to include both a harmonic drive as described for example in said Patent No. 2,906,143, and also a dynamic spline as described for example in said Patent No. 2,959,065.

Typical examples selected from many which could be given where a large circular gear is employed, and where it is sometimes desirable to permit availability of space inside for other purposes, are the following:

(1) In tank turrets the center of the gear must be left free for occupancy for personnel.

(2) In radar antennae the center must be left available for micro wave plumbing or coaxial cables.

Both of these examples have the common character that accurate aiming is necessary. In the case of the tank the accuracy of aiming is important to direct gun fire and in the radar antenna the accurate aiming is important for tracking of flying objects. It is therefore important to have a drive mechanism which has a high degree of rigidity and minimum possible backlash.

Wave converters as set forth in the patents above referred to, are suited to meet these requirements. However, to apply a wave converter to a tank turret or a radar antenna, according to prior art concepts, necessitates an exceedingly heavy wave generator. Such a heavy wave generator at a relatively large diameter would involve reflected inertia which would be prohibitively high. For example, in a tank turret of say 90 inches in diameter, the wave generator, in order to have sufficient rigidity to assure the desired elliptoidal shape, would have to be nearly 12 inches thick. The result would be a rotating mass of toroidal shape, which would be of the order of 90 inches diameter with a ring cross section which would be say 4 inches deep and 12 inches thick radially.

This ring must run at a peripheral speed of the order of 50 to 60 feet per second, and as a consequence the balancing problem alone would be quite serious.

In both of the examples noted above it is mandatory that the aiming be done in the shortest possible period of time. Hence, the inertia of the rotating parts is very critical. By making the rotating mass lighter in weight, the turret or the radar dish can be accelerated to the desired speed in a short period of time and changes in aiming velocity can be quickly made.

By the present invention the reflected inertia can be significantly reduced in the case of a large wave converter so that it is comparable with standard gearing systems, and the advantages of greater rigidity, freedom from backlash, greater load-carrying capacity and linearity of angular position between input and output which are possessed by the wave converter are nevertheless attained so as to insure highly accurate and speedy aiming of even very heavy structures.

Figure 1:
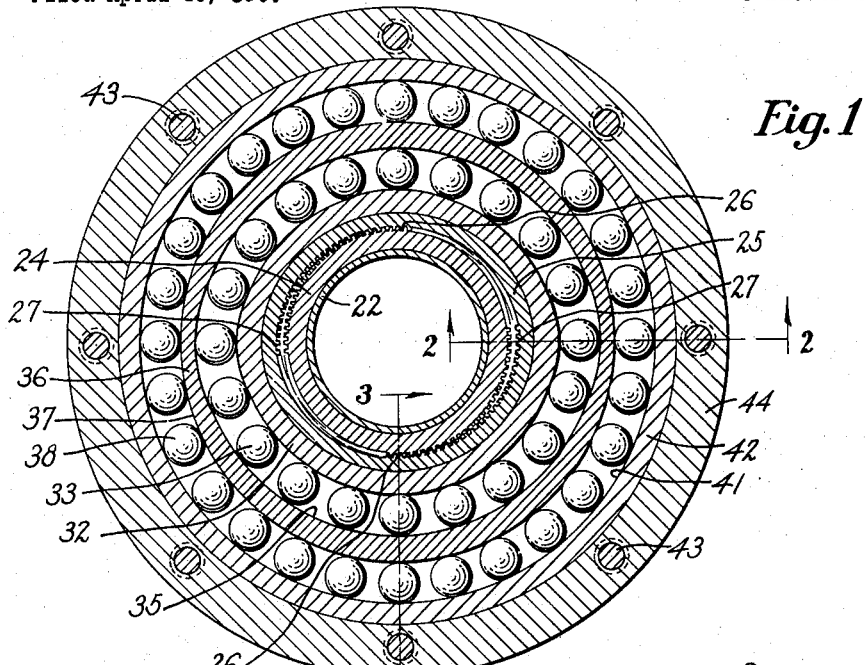
FIGURE 1 is an axial section through a wave converter according to the invention, the section being taken on the line 1—1 of FIGURE 2.
Figure 2:
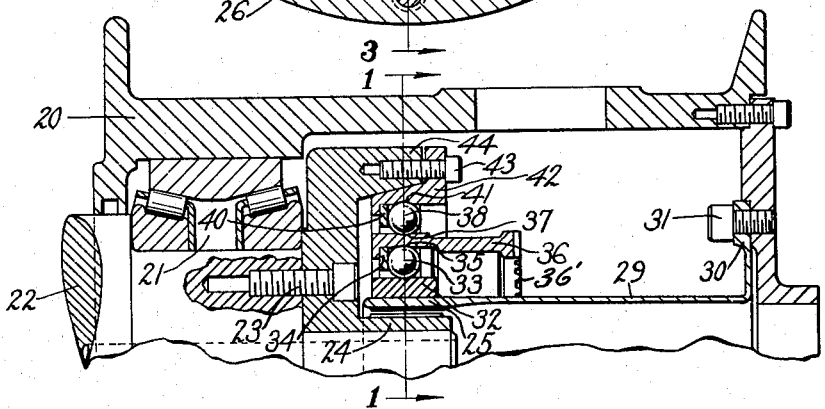
FIGURE 2 is a fragmentary axial section on the line 2—2 of FIGURE 1 at the major axis of the elliptoid.
Figure 3:
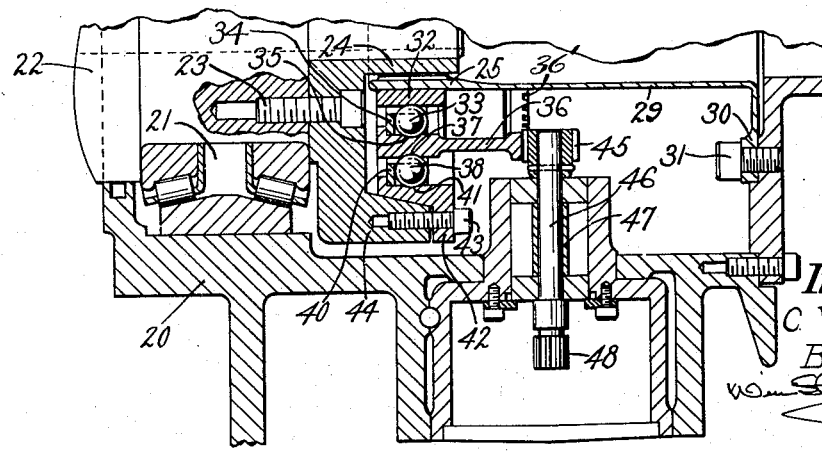
FIGURE 3 is a fragmentary axial section on the line 3—3 of FIGURE 1 at the minor axis of the elliptoid.

In the form of FIGURES 1 to 3, I illustrate a wave generator rotor which is maintained in rolling contact with a relatively fixed race of some radial rigidity which maintains the shape of the wave generator rotor as it rolls. The wave generator rotor accordingly can be made extremely light, and does not require radial rigidity itself.

The device of the invention as shown comprises a housing 20 which mounts an anti-friction bearing 21, suitably an opposed tapered roller bearing, which journals a suitably hollow shaft 22, which may for example be the shaft on which a radar antenna turns. Secured to one end of the shaft as by bolts 23 is an anchor 24, suitably like a ring gear, having external teeth extending around the circumference. In the actual embodiment as described, the element 24 functions as a gear but it will be understood that it may function as a spline in other installations.

Surrounding the anchor 24 is a mating flexible wave carrier 25 of the character described in my patent above referred to. The wave carrier 25 is in effect in telescoping relation to the anchor 24, and has cooperating internal teeth which are of the same tooth form as the external teeth on the anchor 24. The wave carrier has a different number of teeth from the anchor, and the difference in the number of teeth is preferably the same as or permissibly a multiple of the number of lobes on the wave generator. As an example, if the anchor 24 has 200 teeth, there will be 202 teeth on the wave carrier 25. The teeth on the flexible wave carrier 25 are in contact with the teeth on the anchor 24 at a plurality of spaced locations 26, in this case at the minor axis locations, with intervening locations 27, suitably on the major axis, where the teeth are out of contact and out of mesh.

The flexible wave carrier 25 is of generally elliptoidal contour, and by that it is intended to indicate that it resembles an ellipse but differs therefrom because there are two wave lengths of a wave, usually but not necessarily a sine wave, superimposed on a circle in 360°. It will be evident that advantages of the invention can be obtained by providing a contour of the wave carrier which has a major axis and a minor axis as shown without complying exactly with the elliptoidal shape.

While two locations of contact between the spline teeth are shown in FIGURE 1, it will be evident that other suitable numbers of locations of contact with intermediate locations in which the teeth are out of contact may be used as already explained in my patent application above referred to. What is said here about the present teeth under discussion will apply to all the other spline teeth including gear teeth which may be used to embody the principles of the present invention.

In order to permit the propagation of a wave around the wave carrier 25, the wave carrier 25 has a tubular extension 29 which is reduced in thickness and flanged at the end at 30 and secured to the housing by bolts 31.

Immediately surrounding the wave carrier 25 and in contact with it is a flexible bearing race 32 which is the inner race of an anti-friction bearing. The race 32 is immediately outside the toothed portion of the wave carrier 25. The race 32 has a suitable annular bearing groove and receives anti-friction bearing round elements 33, which are shown as balls, but may be rollers if desired. The anti-friction bearing round elements 33 are separated by a bearing cage 34.

The outside of the anti-friction bearing round elements 33 engages in the bearing groove 35 of wave generator rotor 36. The bearing groove 35 is of elliptoidal contour, as is the inner race 32 and the wave carrier 25.

The outside of the wave generator rotor 36 is provided with an annular anti-friction bearing groove 37 which is of circular cross section and receives anti-friction bearing round elements, in this case balls 38 which are spaced by a suitable bearing cage 40. It will of course be evident that it is unimportant in the present invention whether rollers or balls be present at this point.

The anti-friction bearing round elements 38 at the outside engage a groove 41 of a circular race 42 which is radially rigid and conveniently flanged and secured by bolts 43 to a rigid outer rim 44 of the anchor 24.

The wave generator rotor 36 has radial end gear teeth 36' and is driven suitably by pinion 45 on radial shaft 46 which turns in bearing 47 and is driven by pinion 48 from a suitable motor and speed reducer combination, not shown.

In operation of the device of FIGURES 1 to 3, the shaft 46 and pinion 45 turns the wave generator rotor 36 about the common axis of the wave generator and the anchor and wave carrier.

As the wave generator rotor turns, the anti-friction bearing outside it constantly backs it up and maintains its outer circumference circular by support from the rigid circular outer race 42. The inside of the wave generator rotor is always maintained elliptoidal by the backing up of the outer bearing, and through the inner bearing including anti-friction bearing round elements 33, the inner race 32 and the wave carrier 25 are maintained elliptoidal, propagating a wave around the circumference of the splines, and thus causing the rotation of the anchor 24 and the shaft 22. It will be evident that as the wave generator rotor turns, the outside must remain circular, since it is rolling on balls which are in rolling contact with an outer race which is circular. It will also be evident that during this rotation, the shape is made to rotate since the inner race of the wave generator rotor is elliptoidal. As the elliptoidal race rotates, it causes the elliptoidal shape to rotate in the same manner that occurs in harmonic drives of prior art construction.

It will be evident that in the device of the invention the rotating mass is considerably reduced and is in essence the mass of the wave generator rotor and a portion of the ball and separator mass.

Thus the wave generator rotor retains the shape of the elliptoid due to the anti-friction bearing rather than its own structural rigidity.

FIGURES 4 to 6 illustrate a mechanism which may conveniently be the turret transversing mechanism for a tank. The diameters are quite large.

In this form the wave generator rotor is provided with a series of discrete rollers which are pivoted on the wave generator rotor, the inner ones defining a circular path and the outer ones defining an elliptoidal path. Thus as the wave generator rotor turns, the rollers defining the circular path roll on a circular race and maintain the wave generator rotor in radial shape and assure that it will not deflect under driving loads. The rollers which define the elliptoidal path act against the flexible wave carrier, so as to rotate the elliptoidal shape and cause progressive interengagement of the teeth at the major axis, and, in this case, at the minor axis.

Tank hull 50 has a circular anchor or gear portion with internal teeth 51 and has secured thereto as by bolts 52 a closure ring 53 as later explained. The hull has an anti-friction bearing provided with a race 54 coaxial with the anchor, which engages ball elements 55 which also ride in a race 56 on turret 57 also coaxial with the anchor. An oil seal 58 closes the bearing space at the top.

The turret has secured thereon a ring 60 held by bolts 61 and the ring at its outer end has anchor or external circular gear teeth 62 coaxial with the anchor 51 which are oppositely disposed to the teeth 51 and in spaced relation thereto. Secured to the ring 60 and axially below the same is a race 63 having a circular exterior raceway 64 coaxial with the ring anchor teeth 51. Secured to the race 63 immediately below the same is a ring 65, which has anchor or external gear teeth 66 which are on the same diameter and coaxial with the teeth 62. These teeth 62 and all of the others on the wave converters in FIGURES 4 to 6 are of the same tooth form. The ring 60, the race 63 and the ring 65 are all held together by bolts 67 and turn with the turret.

Interposed in the radial space between teeth 51 on the hull anchor and teeth 62 and 66 of the turret anchor is a wave carrier 68 which is flexible radially and is guided axially by the turret at the top and by the hull ring 53 at the bottom. The wave carrier 68 is elliptoidal in shape and has external elliptoidal gear teeth 70 which extend around the elliptoidal circumference and cooperate with teeth 51 on the hull anchor and also has at the inside teeth 71 and 72 at the same radial position which respectively cooperate with teeth 62 and 66 on the turret anchor and which are of elliptoidal form. All of the teeth 70, 71 and 72 are of the same tooth form as the teeth with which they cooperate and for convenience all teeth on the wave converters will be of the same tooth form throughout in the preferred embodiment, suitably of wedge form.

The teeth 70 on the outside of the wave carrier 68 are in contact with the teeth 51 on the hull anchor at two major axis locations 73 as best seen in FIGURE 4 with intervening minor axis locations 74 where the teeth are not in mesh and not in contact.

The teeth 71 and 72 are in contact with the teeth 62 and 66 at minor axis locations 75, but at major axis locations 74' they are not in mesh and not in contact, as best seen in FIGURE 7.

The wave converter teeth which cooperate have a different number in each set. For example, the numbers of teeth in the different sets may be 202 for gear 51, 200 for gear 70, 180 for gears 71 and 72, and 178 for gears 62 and 66.

The wave carrier 68 has at the inside a raceway 77 which is of elliptoidal shape as best seen in FIGURE 4. Interposed between the race 63 and the wave carrier is a wave generator rotor 78 which has somewhat the character of a bearing cage, and has pivotally mounted thereon around the circumference one set of inner rollers 80 which conform to a circular path and engage the outside of the inner circular raceway 64 and also one set of outer rollers 81 which follow an elliptoidal contour and engage the raceway 77 on the inside of the wave carrier.

At the minor axis there are common rollers 82 which function in both sets.

The wave generator rotor has gear teeth 83 at its inside and these gear teeth mesh with a drive pinion 84 keyed on a shaft 85 journalled at 86 in the turret. The shaft 85 also has keyed thereon a pinion 87 which meshes with pinion 88 keyed on shaft 90 also journalled in the turret and driven by a suitable drive motor and speed reduction conveniently mounted on the turret.

In operation the inner race 64 holds the wave generator rotor in its proper shape by engagement with the inner circular rollers and this rotates the elliptoidal shape and causes progressive interengagement of the teeth as shown in FIGURE 4 and FIGURE 7, the wave form progressing around the circumference as described in my aforesaid patent. At the same time the external teeth on the wave carrier are engaged with the fixed circular anchor, the internal teeth on the wave carrier are engaged with the driven circular anchor attached to the turret. The wave progresses and drives the turret.

Thus a relatively thin and lightweight wave generator rotor maintains its elliptoidal shape even though it is not capable of remaining rigid independently of the support which it receives. Thus a radial wave of circumferential amplitude is provided.

The invention is applicable to both harmonic drives and dynamic splines.

It will be evident that while in the present application the wave generator is indicated as having two lobes, the wave generator may instead be provided with three or more lobes as shown in my Patent No. 2,906,143.

It will further be evident that the material for the wave carrier and the anchors and other machine parts will suitably be a construction alloy such as steel, stainless steel, bronze, beryllium copper or the like, the bearing parts preferably being made of bearing steel.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A wave converter including a wave carrier which has a set of teeth and is radially flexible, an anchor for the wave carrier which is radially rigid, the anchor and the wave carrier being coaxial and one surrounding the other, the anchor having a set of teeth which cooperate with the teeth on the wave carrier, said sets of teeth being in contact with one another at a plurality of circumferentially spaced locations with intermediate locations at which the sets of teeth are out of contact and out of mesh, a wave generator rotor telescoping in spaced relation to said flexible wave carrier, having a circular surface remote from said wave carrier and coaxial to said wave carrier and having an elliptoidal surface adjoining the wave carrier, anti-friction bearing round elements operatively interposed between the elliptoidal surface of said wave generator rotor and said wave carrier, a circular race telescoping with respect to said wave generator rotor in spaced relation to said circular surface of the wave generator rotor, and anti-friction bearing round elements operatively interposed between said circular race and the circular surface of said wave generator rotor, said anti-friction bearing round elements being mounted on said wave generator rotor, the circularly and elliptoidally disposed bearing elements cooperating to maintain the shape of the wave carrier during rotation of the rotor.

2. A wave converter of claim 1, in which said anti-friction bearing round elements freely revolve with respect to said wave generator rotor.

3. A wave converter of claim 1, in which said anti-friction round bearing elements are pivotally mounted on said wave generator rotor.

4. A wave converter including a relatively rigid anchor having external teeth, a relatively flexible wave carrier surrounding the anchor and coaxial therewith, having internal teeth of the same tooth form, said teeth being in contact at a plurality of circumferentially spaced locations with intermediate locations at which the teeth are out of contact and out of mesh, in combination with a wave generator comprising a rigid circular race surrounding said wave carrier in spaced relation therewith, a wave generator rotor interposed between said circular race and said flexible wave carrier, anti-friction bearing round elements operatively positioned by said wave generator rotor and defining an elliptoidal path acting on said flexible wave carrier, anti-friction bearing round elements operatively positioned by said wave generator rotor in a circular path and acting outwardly against said circular race, said anti-friction bearing round elements being mounted on said wave generator rotor, and means operatively engaging said wave generator rotor for relatively rotating said wave generator rotor about the common axis.

5. A wave converter of claim 4, in which said anti-friction bearing round elements freely revolve with respect to said wave generator rotor in contact respectively with an elliptoidal surface and a circular surface of said wave generator rotor.

6. A wave converter of claim 4, in which said anti-friction bearing round elements are pivoted on said wave generator rotor respectively defining an elliptoidal path and a circular path.

7. A wave converter, including a first anchor which is relatively rigid and has a set of radial teeth, a second relatively rigid anchor which is co-axial with and in spaced relation from the first anchor, is relatively rigid and has a set of radial teeth disposed toward the teeth on the first anchor, a flexible wave carrier concentric with the first and second anchor, interposed between the first and second anchors, having one set of teeth which cooperate with the teeth on the first anchor and another set of teeth which cooperate with the teeth on the second anchor, the teeth on the wave carrier contacting the teeth on the first and second anchors at a plurality of circumferentially spaced locations with intermediate locations in which they are out of contact and out of mesh, a circular race concentric with the first and second anchors and the wave carrier in spaced relation from the wave carrier, a wave generator rotor interposed between the concentric race and the wave carrier, anti-friction bearing round elements held to a circular path operatively acting between the circular race and the wave generator rotor, anti-friction bearing round elements held to an elliptoidal path operatively acting between the wave generator rotor and one radial side of the wave carrier, said anti-friction bearing round elements being mounted on said wave generator rotor, and means operatively engaging said wave generator rotor for rotating the wave generator rotor about the common axis.

8. A wave converter of claim 7, in which said anti-friction bearing round elements are pivotally mounted on said wave generator rotor.

9. A wave converter including a first rigid circular anchor, having external teeth, a second rigid circular anchor having internal teeth located within the first anchor and coaxial therewith, a flexible wave carrier having both internal and external teeth interposed between the first and second anchors, and coaxial with the first and second anchors, the external teeth on the wave carrier cooperating with the internal teeth on the first anchor, and the internal teeth on the wave carrier cooperating with the external teeth on the second anchor, the wave carrier engaging both the first anchor and the second anchor at a plurality of circumferentially spaced locations with intervening locations in which the teeth are not in contact and not in mesh, a circular race concentric with and in spaced relation to the wave carrier located inside the wave carrier, a wave generator rotor interposed between the circular race and the wave carrier, anti-friction bearing round elements defining a circular path effectively operating between the wave generator rotor and the circular race, anti-friction bearing round elements defining an elliptoidal path effectively operating between the wave generator rotor and the adjoining side of the wave carrier, said anti-friction bearing round elements being mounted on said wave generator rotor, and means operatively engaging said wave generator rotor for rotating the wave generator rotor.

10. A wave converter of claim 9, in combination with guide means on the second anchor for defining the axial position of the wave generator rotor.

11. A wave converter of claim 9, in which the circular race is mounted on and turns with the second anchor.

12. A wave converter of claim 9, having two sets of axially displaced teeth on the second anchor and two cooperating sets of axially displaced teeth on the wave carrier, and guide means between said sets of teeth for axially defining the position of the wave generator rotor.

13. A wave converter of claim 9, in combination with bearing means operatively interposed between the first and second anchors.

14. A wave converter of claim 13, in combination with means on the first anchor guiding the wave carrier at one axial end, and means on the second anchor guiding the wave carrier at the opposite axial end.

References Cited in the file of this patent

UNITED STATES PATENTS

| | | |
|---|---|---|
| 2,682,179 | Freeman | June 29, 1954 |
| 2,906,143 | Musser | Sept. 29, 1959 |